US012020382B2

(12) United States Patent
Whitman et al.

(10) Patent No.: US 12,020,382 B2
(45) Date of Patent: Jun. 25, 2024

(54) PHYSICAL AND VIRTUAL ENVIRONMENT SYNCHRONIZATION

(71) Applicant: Kyndryl, Inc., New York, NY (US)

(72) Inventors: Todd Russell Whitman, Bethany, CT (US); Zachary A. Silverstein, Georgetown, TX (US); Jeremy R. Fox, Georgetown, TX (US); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 147 days.

(21) Appl. No.: 17/702,823

(22) Filed: Mar. 24, 2022

(65) Prior Publication Data

US 2023/0306691 A1    Sep. 28, 2023

(51) Int. Cl.
| | | |
|---|---|---|
| G06T 19/00 | (2011.01) | |
| G06V 20/20 | (2022.01) | |
| H04W 4/38 | (2018.01) | |

(52) U.S. Cl.
CPC ............ *G06T 19/006* (2013.01); *G06V 20/20* (2022.01); *H04W 4/38* (2018.02)

(58) Field of Classification Search
CPC ........ G06T 19/006; H04W 4/38; G06V 20/20
USPC .......................................... 345/418; 715/706
See application file for complete search history.

(56) References Cited

U.S. PATENT DOCUMENTS

| | | |
|---|---|---|
| 10,019,962 B2 | 7/2018 | Liu et al. |
| 10,073,516 B2 | 9/2018 | Larsen et al. |
| 2008/0215975 A1* | 9/2008 | Harrison ............... A63F 13/213 715/706 |
| 2011/0270135 A1 | 11/2011 | Dooley et al. |
| 2013/0182858 A1 | 7/2013 | You et al. |
| 2013/0215010 A1 | 8/2013 | Hermodsson |
| 2016/0142830 A1 | 5/2016 | Hu |
| 2016/0217615 A1* | 7/2016 | Kraver ............... G02B 27/0172 |

(Continued)

FOREIGN PATENT DOCUMENTS

| | | |
|---|---|---|
| CN | 107111370 | 8/2017 |
| WO | 2019019311 | 1/2019 |

OTHER PUBLICATIONS

Mell et al., "The NIST Definition of Cloud Computing", NIST, Special Publication 800-145, Sep. 2011, 7 pages.

(Continued)

*Primary Examiner* — Prabodh M Dharia
(74) *Attorney, Agent, or Firm* — Dan Housley; Andrew M. Calderon; Calderon Safran & Wright P.C.

(57) ABSTRACT

Systems and methods synchronize content of a virtual environment with a state of a physical environment. In aspects, a method includes obtaining sensor data from a network of remote sensors measuring a physical state of a location at a time; generating context specific parameter data based on the sensor data; obtaining context data from a remote virtual reality (VR) system, wherein the context data reflects a current state of virtual content in a virtual environment displayed by the remote VR system; selecting virtual content to be displayed in the virtual environment by the remote VR system based on the context specific parameter data, the context data, and rules; and sending the virtual content to the remote VR system to be displayed to a user, wherein the virtual content reflects a state of the physical location at the time.

20 Claims, 7 Drawing Sheets

(56) References Cited

U.S. PATENT DOCUMENTS

| | | | |
|---|---|---|---|
| 2018/0157398 A1* | 6/2018 | Kaehler | G06F 3/04815 |
| 2018/0160105 A1 | 6/2018 | Ross et al. | |
| 2019/0139321 A1* | 5/2019 | Kocharlakota | G06T 19/20 |
| 2020/0289926 A1 | 9/2020 | Silverstein et al. | |
| 2020/0334907 A1 | 10/2020 | Bender et al. | |
| 2020/0357175 A1 | 11/2020 | Silverstein et al. | |
| 2022/0009535 A1* | 1/2022 | Weiner | B25J 9/1674 |
| 2022/0050523 A1* | 2/2022 | Marks | A63F 13/212 |

OTHER PUBLICATIONS

Huo et al., "SynchronizAR: Instant Synchronization for Spontaneous and Spatial Collaborations in Augmented Reality", Oct. 14-17, 2018, 12 pages.

Inoue et al., "Visualization of 3D Sound Field using See-Through Head Mounted Display", Jul. 30-Aug. 3, 2017, 2 pages.

Lee et al., "Social Augmented Reality for Sensor Visualization in Ubiquitous Virtual Reality", 2011, 7 pages.

Goldsmith et al., "Augmented Reality Environmental Monitoring Using Wireless Sensor Networks", https://ieeexplore.ieee.org/abstract/document/4578002, Jul. 25, 2008, 3 pages.

Widman, "AR and VR bring a new twist to collaboration", https://www.computerworld.com/article/3329746/ar-and-vr-bring-a-new-twist-to-collaboration.html, Jan. 3, 2019, 10 pages.

* cited by examiner

FIG. 6A  FIG. 6B

PHYSICAL AND VIRTUAL ENVIRONMENT SYNCHRONIZATION

BACKGROUND

Aspects of the present invention relate generally to virtual reality systems and, more particularly, to the synchronization of a virtual environment with a state of a physical environment.

Virtual reality (VR) systems are growing in popularity, and include non-immersive VR systems, fully immersive VR systems, semi-immersive VR systems, and augmented or mixed reality VR systems, for example. In general, VR systems enable a user to navigate within one or more VR environments using one or more VR computing devices. In mixed reality VR systems, elements of a physical environment of the user are combined with a virtual environment.

SUMMARY

In a first aspect of the invention, there is a computer-implemented method including: obtaining, by a computing device, sensor data from a network of remote sensors measuring a physical state of a location at a time; generating, by the computing device, context specific parameter data based on the sensor data, wherein the context specific parameter data includes values for different parameters at the time; obtaining, by the computing device, context data from a remote VR system via a network connection, wherein the context data reflects a current state of virtual content in a virtual environment displayed by the remote VR system; selecting, by the computing device, virtual content from a store of virtual content to be displayed in the virtual environment by the remote VR system based on the context specific parameter data, the context data, and stored rules; and sending, by the computing device, the virtual content to the remote VR system to be displayed to a user, wherein the virtual content reflects a state of the physical location at the time.

In another aspect of the invention, there is a computer program product including one or more computer readable storage media having program instructions collectively stored on the one or more computer readable storage media. The program instructions are executable by a computing device to: obtain sensor data from a network of remote sensors measuring a physical state of a location at a time; generate context specific parameter data based on the sensor data, wherein the context specific parameter data includes values for different parameters at the time; obtain context data from a remote VR system via a network connection, wherein the context data reflects a current state of virtual content in a virtual environment displayed by the remote VR system; select virtual content from a store of virtual content to be displayed in the virtual environment by the remote VR system by matching characteristics of the virtual content with corresponding characteristics in the context specific parameter data based on the context data and stored rules; and stream the virtual content to the remote VR system to be displayed to a user in a virtual environment, wherein the virtual content reflects a state of the physical location at the time.

In another aspect of the invention, there is system including a processor, a computer readable memory, one or more computer readable storage media, and program instructions collectively stored on the one or more computer readable storage media. The program instructions are executable by a virtual reality system to: obtain sensor data from a network of remote sensors measuring a physical state of a location at a time; generate context specific parameter data based on the sensor data, wherein the context specific parameter data includes values for different parameters at the time; determine context data reflecting a current state of virtual content in a virtual environment displayed by the virtual reality system; select virtual content from a store of virtual content to be displayed in the virtual environment by the virtual reality system based on the context specific parameter data, the context data, and stored rules; and displaying the virtual content in the virtual environment to a user, wherein the virtual content reflects a state of the physical location at the time.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
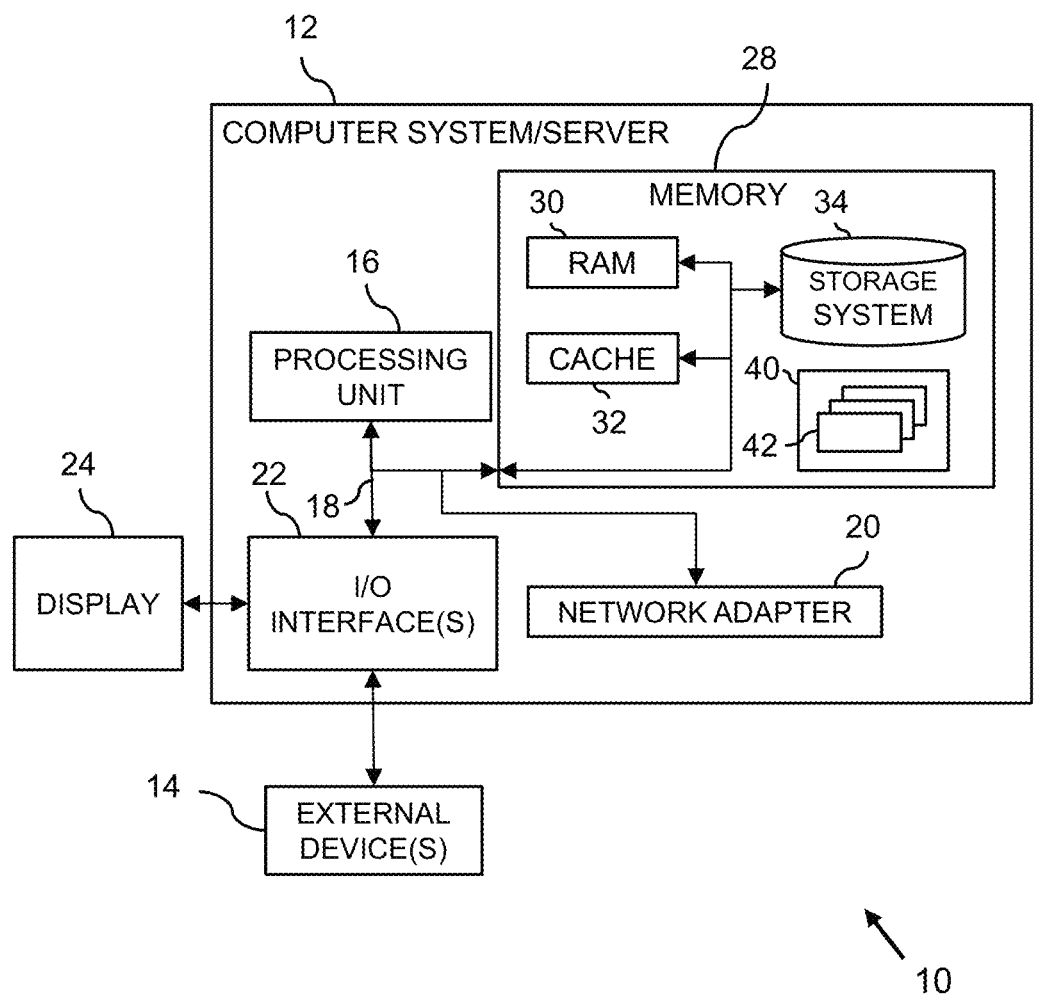
FIG. 1 depicts a cloud computing node according to an embodiment of the present invention.

Aspects of the present invention relate generally to virtual reality (VR) systems and, more particularly, to the synchronization of a virtual environment with a state of a physical environment. In embodiments, a system and method are provided that enable synchronization of virtual content in a virtual environment with external stimuli of a physical environment so that the physical environment is more realistically rendered or depicted in the virtual environment. External stimuli may include any real-world force that can create a visual or physical impact on a corporeal object, such as magnetic fields, light (e.g., intensity and direction), electrical fields, temperature, wind (e.g., force and direction), etc. In embodiments, different types of sensors of a sensor network are utilized to measure parameter values of external stimuli in a defined physical location over time. In implementations, streaming sensor data or recorded sensor data capturing changing parameter values of the external stimuli over a period of time are utilized by a VR system to render a virtual environment to a user over a corresponding period of time, such that content of the virtual environment reflects the changing parameter values. In implementations, the user can visualize and interact with digital objects in the virtual environment that are dynamically modified based on the changing parameters values of the external stimuli in the corresponding physical environment. In one example, wind speed and direction measurements in a physical environment are utilized by a VR system to render virtual trees in the virtual environment that appear to be moving based on the wind speed and direction measurements. In another example, virtual sunlight can be shown moving across different virtual objects in a virtual environment consistent with the movement of sunlight within the physical environment.

Standard VR systems lack the ability to reflect dynamically changing external stimuli of a physical environment. Accordingly, implementations of the invention provide improved VR systems by adding functionality of contextually synchronizing sensor data measuring changing external stimuli with virtual content in a virtual environment. In this way, virtual content (e.g., virtual objects) in a virtual environment dynamically reflects changes that would be seen in corporeal objects in a physical environment over a period of time due to external stimuli such as wind, light, temperature, precipitation, etc. In implementations, a user who is immersed within a virtual environment but is also located within the physical environment and experiencing the external stimuli, will have their physical experience match their virtual experience. For example, the user may feel actual wind and also see the effect of the wind reflected in changes to objects in the virtual environment (e.g., trees moving in the wind).

Embodiments of the invention utilize special-purpose computing devices including VR devices (e.g., wearable VR headsets) and one or more content servers, and address the technical problem of synchronizing attributes of a virtual environment with attributes of a physical environment.

In aspects of the invention, a method includes: identifying various types of external stimulus from real world surroundings using internet-of-things (IoT) sensors; synchronizing VR content with the identified external stimulus from the real world surroundings; analyzing data related to the identified external stimulus based on a physical distance of different external stimulus from a user, a level or degree of the external stimulus, a direction of a change in the external stimulus, a duration of the external stimulus, and types of the external stimulus; injecting the analyzed data related to the identified external stimulus into the VR content, wherein a VR system receives IoT sensor feeds on a real-time basis for the external stimulus; determining a rate of change in sensor parameter values in the real-world surroundings along with a relative distance of the IoT sensors in the real world to synchronize dynamically with the VR content; adjusting a strength of the injected data relative to a position of a user with a virtual rendering; and recreating a selected point in time of the IoT sensor injection in the VR content to replay an actual event location for a specific time period for later uses. In implementations, IoT sensors may collect data regarding different parameter values (e.g., wind speed, wind direction). Embodiments of the invention further include determining external influence factors based on a distance from the user, intensity, and rate of change in the sensor values. In implementations, a system allows the user to move around a sensor area network while navigating the VR contents of a virtual environment, and the method further includes detecting changing sensor parameters to reflect changes in the VR content.

It should be understood that, to the extent implementations of the invention collect, store, or employ personal information provided by, or obtained from, individuals (for example, user profile data), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
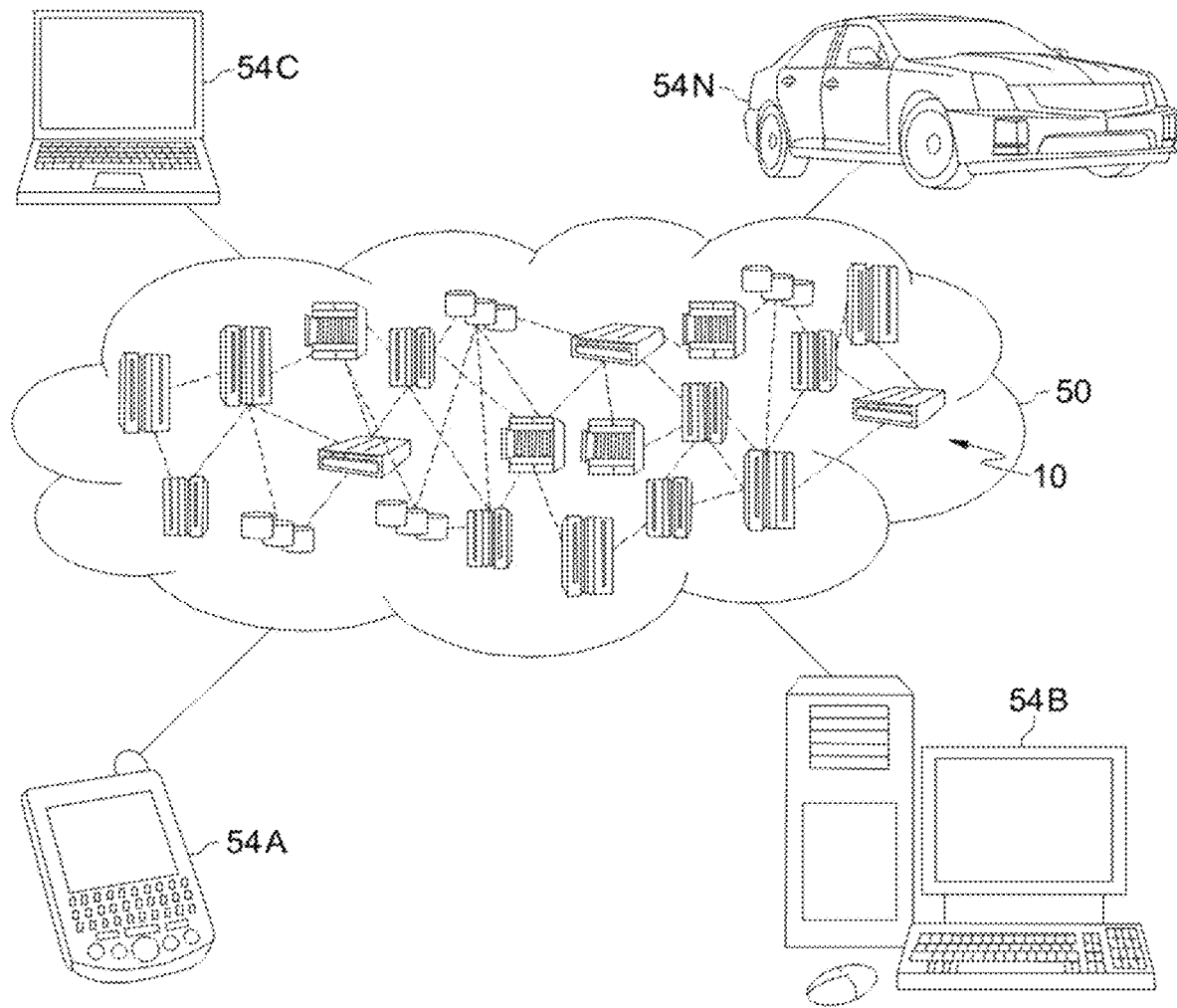
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
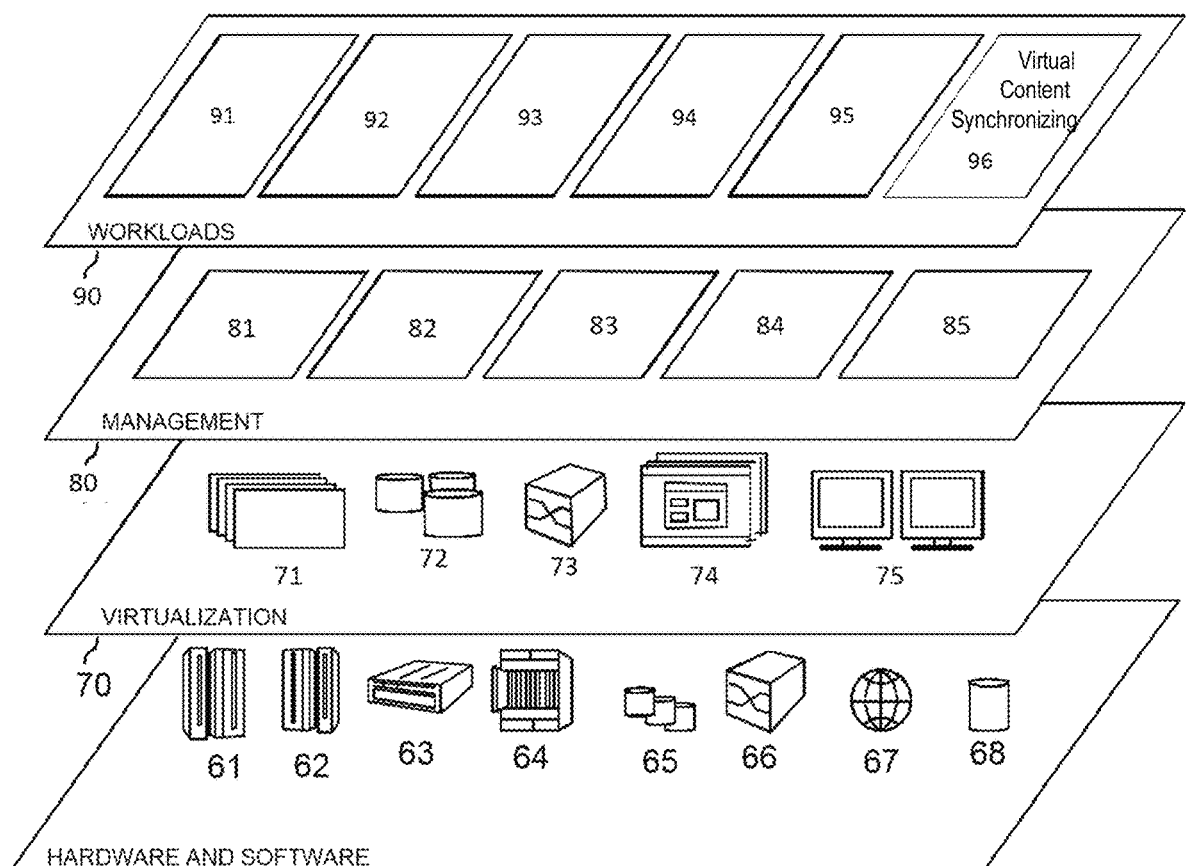
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual content synchronizing 96.

Implementations of the invention may include a computer system/server 12 of FIG. 1 in which one or more of the program modules 42 are configured to perform (or cause the computer system/server 12 to perform) one of more functions of the virtual content synchronizing 96 of FIG. 3. For example, the one or more of the program modules 42 may be configured to: obtain sensor data from a network of remote sensors measuring a physical state of a location at a time; generate context specific parameter data based on the sensor data, wherein the context specific parameter data includes values for different parameters at the time; obtain or determine context data from a remote VR system via a network connection, wherein the context data reflects a current state of virtual content in a virtual environment displayed by the remote VR system; select virtual content from a store of virtual content to be displayed in the virtual environment by the remote VR system based on the context specific parameter data, the context data, and stored rules; and send (e.g., stream) the virtual content to the remote VR system to be displayed to a user, wherein the virtual content reflects a state of the physical location at the time.

Figure 4:
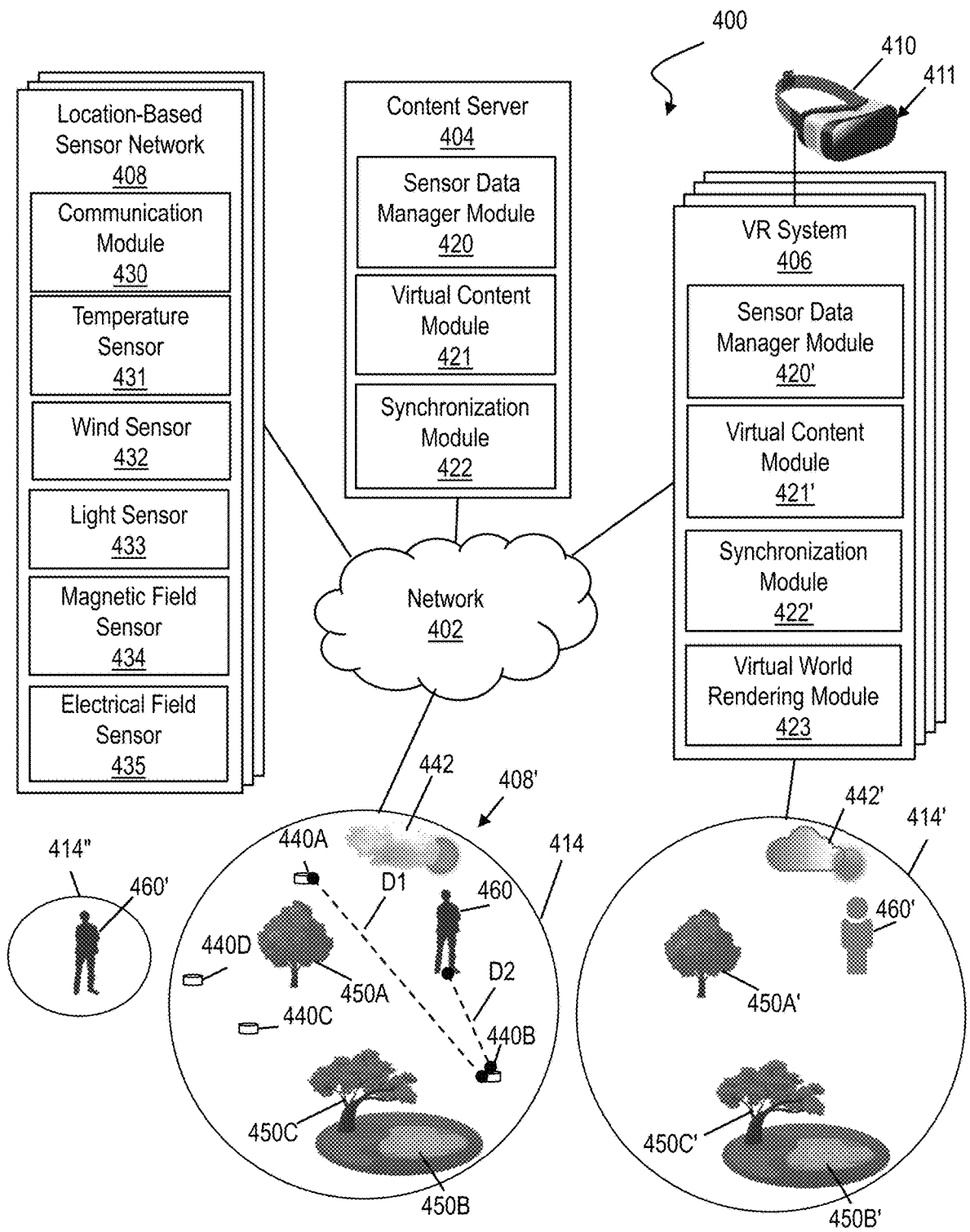
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 402 enabling communication between one or more of: a content server 404, one or more virtual reality (VR) systems 406, and one or more location-based sensor networks 408. In implementations, the VR system 406 includes a wearable headset device 410 for displaying virtual content to a user via a display indicated at 411. It should be understood that various VR systems 406 may be configured for use with embodiments of the invention, and the invention is not intended to be limited to a particular type of VR system 406. VR systems 406 for use with the implementations of the invention may include non-immersive VR systems, fully immersive VR systems, semi-immersive VR systems, and augmented or mixed reality VR systems, for example.

In embodiments, the content server 404 is in communication with multiple location-based sensor networks 408, one of which is illustrated at 408'. Each location-based sensor network 408 may be located within a defined geographic area or physical location, as exemplified by the physical location 414 in FIG. 4. In implementations, the VR system 406 is configured to render a virtual environment 414' that corresponds to the physical location 414 based on sensor data from a plurality of sensors (e.g., sensors 440A-440D) located at the physical location 414. The virtual environment 414' may be an augmented reality environment or a fully immersive VR environment, for example. In embodiments, physical objects located in the physical location 414 (e.g., tree 450A, pond 450B and tree 450C) may be reflected as corresponding virtual objects (e.g., virtual tree 450A', virtual pond 450B', and virtual tree 450C') in the virtual environment 414'. In implementations, a user 460 within the boundaries of the physical location 414 may be reflected as an avatar 460' within the corresponding virtual environment 414'. Additionally, weather conditions (represented by reference 442) in the physical location 414 may be reflected as virtual weather conditions (represented by reference 442') in the virtual environment 414'.

In other embodiments, a user 460" of a VR system 406 is at a physical location 414" remote from the physical location 414 of the location-based sensor network 408, and experiences a virtual environment 414' that is associated with the remote physical location 414. As an example, the physical location 414 may be a beach location in Hawaii having a location-based sensor network 408 including video cameras, sound sensing devices, atmospheric sensors and other sensors that provide active measurement of physical stimuli at the physical location 414. The measurements may be stored for later use or for transmission in real-time to the VR system 406 of a user 460 to generate a virtual experience of being at the beach in Hawaii, while the user 460 is physically located elsewhere in the world (e.g., at location 414"). In some applications, sensor data collected from a physical location in real time or historic sensor data collected at a prior time, may be utilized by a VR system 406 of a user to investigate or explore the physical location via a virtual rendering of the physical location (in real time or for the historic time period).

The one or more content servers 404, the one or more VR systems 406, and the one or more location-based sensor networks 408 may each comprise the computer system/server 12 of FIG. 1, or elements thereof. In embodiments, the one or more content servers 404, the one or more VR systems 406, and the one or more location-based sensor networks 408 include one or more modules, each of which may comprise one or more program modules such as program modules 42 described with respect to FIG. 1.

In implementations, the one or more content servers 404, the one or more VR systems 406, and the one or more location-based sensor networks 408 comprise computing nodes 10 in the cloud computing environment 50 of FIG. 2. The one or more virtual reality (VR) devices 410 may be local computing devices used by cloud consumers in the cloud computing environment 50 of FIG. 2, for example. The content server 404 may be a cloud-based server configured to provide VR services to users of the cloud computing environment 50 of FIG. 2, for example.

In implementations, the content server 404 includes a sensor data manager module 420 configured to obtain data from one or more location-based sensor networks 408 and determine context specific parameter data based on the sensor data. In aspects of the invention, the sensor data manager module 420 is configured to determine the location of sensors and the relative distance (e.g., D1) between sensors (e.g., 440A and 440B) within the location-based sensor network 408, and adds the information to the context specific parameter data.

In embodiments, the content server 404 further includes a virtual content module 421 configured to store and access digital content data for one or more virtual environments. Implementations of the content server 404 also include a synchronization module 422 configured to select virtual content for a virtual environment 414' of a VR system 406, based on sensor data and context data of the VR system 406, in order to synchronize external stimuli of a physical environment 414 with the display of virtual content in the virtual environment 414'. In implementations, the synchronization module 422 is configured to determine the relative location of a user 460 or an avatar 460' of the user with respect to sensors based on context data from the VR system 406. For example, the synchronization module 422 may determine that a user 460 or an avatar 460' is in an actual or virtual location that is a distance D2 from a sensor 440B.

The exemplary VR system 406 of FIG. 4 includes a sensor data manager module 420', a virtual content module 421', a synchronization module 422' and a virtual world rendering module 423. The sensor data manager module 420' may be configured to perform the same functions as the sensor data manager module 420 of the content server 404. Likewise, the virtual content module 421' and the synchronization module 422' of the VR system 406 may be configured to perform the same functions as the respective virtual content module 421 and synchronization module 422 of the content server 404.

In implementations, the virtual content module 421' of the VR system 406 is configured to communicate with the virtual content module 421 of the content server 404, and obtain virtual content data (e.g., digital data) for a virtual environment (e.g., 414') generated (rendered) by the VR system 406. In aspects of the invention, the virtual content module 421' is further configured to generate context data for the virtual environment 414', and may provide the context data to the content server 404. In embodiments, the VR system 406 determines a location of a user or avatar 460' within the virtual environment 414' and saves the information as context data. In embodiments, a user of the VR system 406 can visualize virtual objects (e.g., digital objects) in a head mounted display device (e.g., VR headset device 410). In implementations, the virtual world rendering module 423 of the VR system 406 is configured to obtain select virtual content from the content server 404 for display by the VR system 406 to a user (e.g., via the display 411 of the VR headset device 410).

In embodiments, the location-based sensor network 408 includes a communication module 430 configured to communicate sensor data obtained from a plurality of sensors to the sensor data manager module 420 of the content server 404 and/or the sensor data manager module 420' of the VR system 406. In implementations, the location-based sensor network 408 is configured to gather sensor data (e.g., recorded measurements) for external stimuli at a particular location (e.g., location 414). In implementations, the term external stimuli refers to any characteristic of the location that can or does create an impact on physical objects at the location, such as magnetic fields, direction of light, electrical fields, temperature, wind forces, etc. Each location-based sensor network 408 may include different sensors, such that an array of sensors at a location may be configured to detect different types of external stimuli in the real world. Sensors of the location-based sensor network 408 may include internet of things (IoT) sensing devices.

By way of example, the location-based sensor network 408 is depicted as including a temperature sensor 431, a wind sensor 432, a light sensor 433, a magnetic field sensor 434, and an electrical field sensor 435. In implementations, the communication module 430 is incorporated with one or more of the sensors (e.g., 431-435) of the location-based sensor network 408. Other sensors may measure aspects of precipitation, water flow characteristics, or other physical phenomenon within a physical environment (e.g., the physical location 414) that affect the state of the physical environment. The number and type of sensors utilized in embodiments of the invention may vary, and the invention is not meant to be limited to the examples described herein.

In embodiments, a VR synchronization system performs the synchronization of external stimuli data with virtual content for a virtual environment 414' at the content server 404 (e.g., via the sensor data manager module 420, the virtual content module 421 and the synchronization module 422). In alternative embodiments, a VR synchronization system performs the synchronization of external stimuli data with virtual content for a virtual environment 414' at the VR system 406 (e.g., via the sensor data manager module 420', the virtual content module 421' and the synchronization module 422'). In other embodiments, the synchronization of external stimuli data with virtual content for a virtual environment 414' is performed by modules of both the content server 404 and the VR system 406.

In an exemplary use scenario, a user (e.g., user 460) interacts with VR content in a virtual environment 414' via the VR system 406 at a location 414, and experiences the physical stimuli of the location 414 (e.g., hot, windy conditions at the physical environment), wherein the VR content is displayed in a way that matches/aligns with the conditions at the location 414 (e.g., the VR environment depicts hot, windy conditions). Such synchronization between a physical location 414 and a virtual location or virtual environment 414' creates a more interesting VR (e.g., mixed reality) experience for the user, and generates a more accurate contextual simulated reality for the user.

In embodiments, the content server 404, VR system 406 and location-based sensor network 408 may each include additional or fewer modules than those shown in FIG. 4. In embodiments, separate modules may be integrated into a single module. Additionally, or alternatively, a single module may be implemented as multiple modules. Moreover, the quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4.

Figure 5:
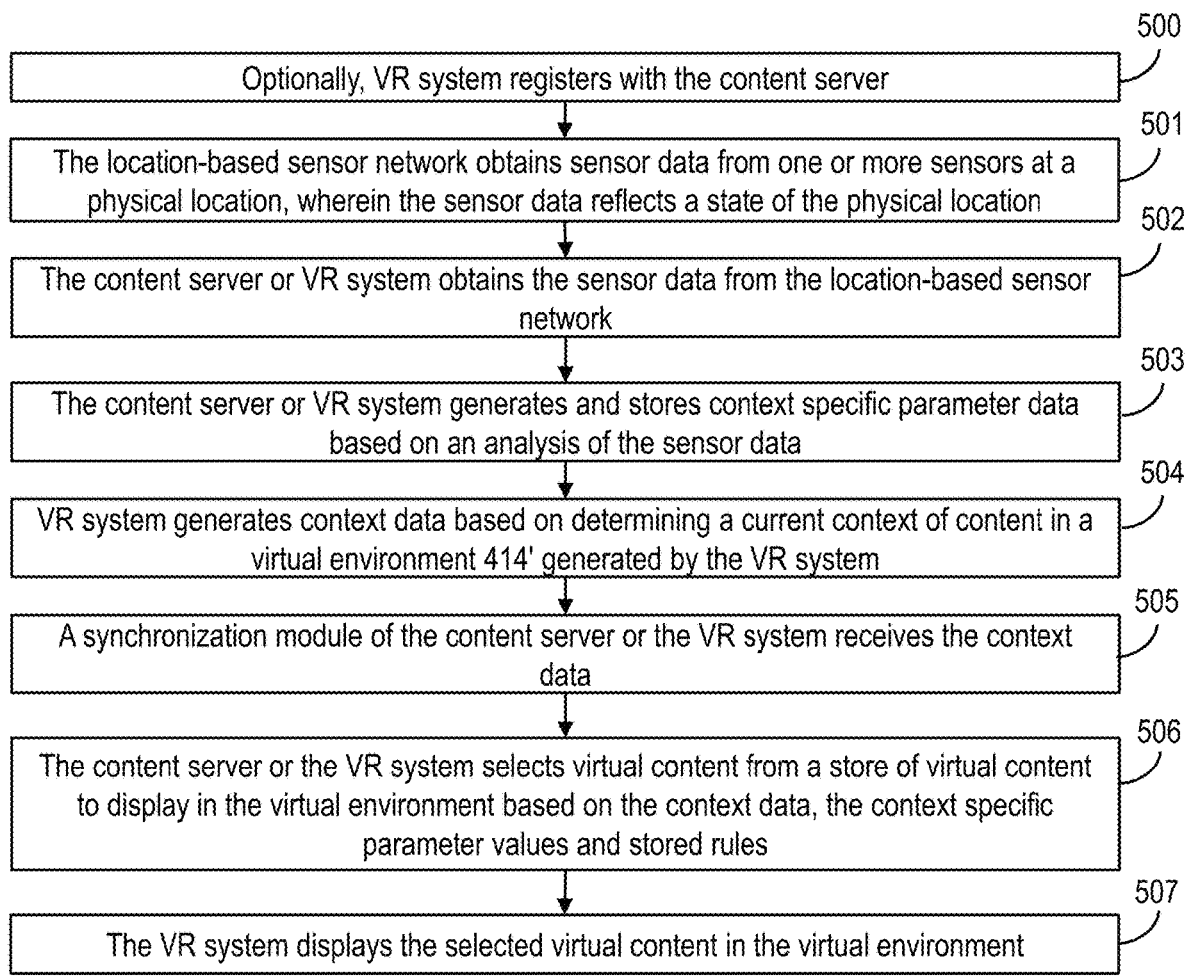
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

Optionally, at step 500, a user of a VR system 406 registers with the content server 404 by providing user profile data to the content server 404 (e.g., via a user interface of the VR system). User profile data may include a make and model or other characteristics of the VR system 406, for example, and authorization to obtain context data from the VR system 406 and supply content to the VR system 406. In implementations, the virtual content module 421' of the VR system 406 is configured to implement step 500.

At step 501, the location-based sensor network 408 obtains sensor data from one or more sensors (e.g., sensors 431-435) at a physical location 414, wherein the sensor data reflects a state of the physical location 414 at a particular time or over a particular time period. The state of the physical location 414 may include measurements of different physical stimuli at the physical location 414. The sensor data may comprise values for a plurality of parameters (e.g., air temperature, water temperature, wind speed, wind direction, etc.), and may be in the form of machine readable digital data. In implementations, the communication module 430 of the sensor network 408 obtains sensor data from one or more of sensors (e.g., sensors 430-435) of the location-based sensor network 408. In embodiments, the sensor data includes time data indicating when data was obtained at the physical location (e.g., timestamp data). The sensors (e.g., 431-435) may be IoT sensors in wireless communication with the communication module 430 of the location-based network 408. Alternatively, the sensors may be IoT sensors in direct wireless communication with the content server 404 and/or the VR system 406.

In embodiments, at step 502, the content server 404 obtains the sensor data from the location-based sensor network 408. In implementations, the sensor data manager module 420 of the content server 404 obtains the sensor data from the communication module 430 of the location-based sensor network 408, and/or directly from individual sensors (e.g., 431-435).

In an alternative embodiment of step 502, the VR system 406 obtains the sensor data from the location-based sensor network 408. In implementations, the sensor data manager module 420' of the VR system 406 obtains the sensor data from the communication module 430 of the location-based sensor network 408, and/or directly from individual sensors (e.g., 431-435).

In either embodiment at step 502, the sensor data may be sensor data collected over a period of time that is obtained all at once as a group of historic sensor data, or may be in the form of streaming real-time sensor data obtained continuously over a period of time. In implementations, the sensor data includes time data (e.g., timestamp data) indicating when the sensor data was obtained at the physical location 414. In embodiments, the content server 404 and/or the VR system 406 obtains the sensor data through a wireless network connection (e.g., a Bluetooth connection) with the communication module 430 of the location-based sensor network 408.

In embodiments, at step 503, the content server 404 analyzes the sensor data based on stored rules to determine characteristics of the sensor data and generate and store context specific parameter data for different parameters (e.g., physical stimuli). In embodiments, the sensor data manager module 420 of the content server 404 implements step 503.

In an alternative embodiment of step 503, the VR system 406 analyzes the sensor data based on stored rules to determine characteristics of the sensor data and generate context specific parameter data for different parameters (e.g., physical stimuli). In embodiments, the sensor data manager module 420' of the VR system 406 implements step 503.

In either embodiment of step 503, the characteristics of the sensor data that are determined may include: type of sensor value or external stimulus, level or degree of sensor value or external stimulus, duration of sensor value or external stimulus, rate of change of sensor value or external stimulus, physical distance between each sensor or external stimulus measurement, direction of change of an external stimulus, location of sensors, and/or other information. Types of sensor values may include temperature, wind, light, magnetic field, and electrical field, for example. The level or degree of sensor values may include high, low, and medium, for example, and may be determined based on stored rules (e.g., predetermined threshold values for different parameters or sensor types). In one example, wind speeds under a first threshold value are considered low, wind speeds over the first threshold value and below a second threshold value are considered medium, and wind speeds over the second threshold value are considered high.

In embodiments, the context specific parameter data are associated with and/or determined based on the time data indicating when sensor data was obtained at the physical location. In implementations, the context specific parameter data are stored as time series data based on the time data. In one example, the context server 404 or the VR system 406 determines a change in wind speed over a period of time at a location 414 based on the sensor data and associated time data.

At step 504, the VR system 406 determines a current context of virtual content in a virtual environment 414' generated by the VR system 406 at a particular time, and generates context data for the particular time based thereon. In implementations, the current context represents a current state of the virtual environment 414', including the current state of virtual objects therein. In embodiments, the context data includes an actual physical location of a user 460 (e.g., based on global positioning data) or a virtual location of the user or an avatar 460' of the user within a virtual location or environment 414' (based on the virtual content of the virtual environment 414').

In implementations, the VR system 406 continuously determines context data that reflects the current state of content in a virtual environment displayed by the VR system 406 over a period of time. The context data may include timestamp data reflecting a time at which the context data was determined. In embodiments, the virtual content module 421' of the VR system 406 implements step 504. The current context data may include virtual objects and/or type of virtual objects present in the virtual environment 414' (e.g., tree 450', pond 450B'), the location of the virtual objects within the virtual environment 414', the relative position of the virtual objects with respect to one another and/or a user or avatar 460' within the virtual environment 414', and current virtual environment characteristics (e.g., virtual light levels, virtual weather, virtual time of day, etc.).

In embodiments, the VR system 406 recognizes each and every virtual object individually, and stores metadata characteristics (properties) for each virtual object. In aspects, metadata characteristics determine how a virtual object reacts to external stimuli, such as what happens to virtual ice when heat is applied, what happens to a virtual iron object within a magnetic field, etc.

In implementations, the VR system 406 determines context data based on metadata characteristics associated with virtual content objects. Different versions of virtual content may be associated with different characteristics based on different levels (e.g., strength levels) of external stimuli. For example, the tree 450A' of the virtual environment 414' may have characteristics that change depending on context specific parameter data, wherein the depiction of the tree 450A' by the VR system 406 in the virtual environment 414' can be changed over time. In one example, the context data includes data indicating that a virtual tree is being displayed with characteristics consistent with a low wind level based on metadata characteristics associated with the tree 450A' object.

In embodiments, at step 505, the content server 404 receives the context data from the VR system 406. In implementations, the content server 404 receives the context data continuously (as streaming data) in real time from the VR system 406. Alternatively, the content server 404 may obtain context data in one or more batches. In embodiments, the synchronization module 422 of the content server 404 receives the context data from the virtual content module 421' of the VR system 406.

In another embodiment of step 505, the synchronization module 422' of the VR system 406 receives the context data from the virtual content module 421' of the VR system 406. In implementations, the virtual content module 421' continuously determines the context data and continuously sends (streams) the context data to the synchronization module 422'.

In embodiments, at step 506, the content server 404 selects virtual content from a store of virtual content to display in the virtual environment 414' of the VR system 406 based on the context data, the context specific parameter data, and stored rules. In aspects of the invention, stored virtual content includes different versions of virtual objects for different states of the physical location (e.g., for different external stimuli). In embodiments, the content server 404 identifies what virtual content is displayed in the virtual environment 414', and identifies which sensor values in the context specific parameter data influence the virtual contents based on stored rules.

In implementations, the synchronization module 422 of the content server 404 selects virtual content from a store of virtual content in the virtual content module 421 of the content server 404 based on rules accessed by the synchronization module 422, the context data received from the VR system 406, and the context specific parameter data determined from the sensor data. In embodiments the synchronization module 422 compares characteristics of context specific parameter data with characteristics of stored virtual content and characteristics of virtual object in the context data to determine if changes need to be made to virtual content in the virtual environment 414'.

In an alternative embodiment of step 506, the VR system 406 selects virtual content from a store of virtual content to display in the virtual environment 414' of the VR system 406 based on the context data, the context specific parameter data, and stored rules. In implementations, the synchronization module 422' of the VR system 406 selects virtual content from a store of virtual content in the virtual content module 421' of the VR system 406 based on rules accessed by the synchronization module 422', the context data, and the context specific parameter data determined from the sensor data. In embodiments the synchronization module 422' compares characteristics of context specific parameter data with characteristics of stored virtual content and characteristics of virtual object in the context data to determine if changes need to be made to virtual content in the virtual environment 414'.

In embodiments, step 506 includes the synchronization module 422 or 422' performing the sub steps of: determining a position of a virtual user in the virtual environment based on the context data; determining a location of each of the plurality of sensors within the physical location 414, calculating a relative distance between each of the plurality of remote sensors and the virtual user, and selecting and/or displaying virtual content based on the relative distance between each of the plurality of remote sensors and the virtual user. Weights may be applied to characteristics depending on the relative location of the virtual objects, sensors, and user or avatar. For example, the effect of or intensity of a physical stimuli (e.g., magnetic field) may be lowered by synchronization module 422 or 422' the farther from the source of the magnetic field measurement a user or avatar is within the virtual environment 414', such that characteristics of the virtual content selected for the virtual environment 414' may change based on the relative location of virtual objects, sensors and users or avatars.

In one example, the synchronization module 422 or 422' determines, based on the context specific parameter data, that a high wind event (high wind level) is occurring at the location 414, determines that the current content of the virtual environment 414' includes virtual objects whose display is changed depending on a level of wind at the location 414 according to stored rules, and selects virtual content from a store of virtual content that includes virtual objects with characteristics that match the high wind event. In this example, the synchronization module 422 or 422' determines that rules indicate different versions of the virtual tree 450A' should be presented in the virtual environment 414' depending on the level or degree of wind speed in the physical location. In this case, the synchronization module 422 or 422' selects stored content for the virtual tree 450A' which depicts the virtual tree 450A' as reacting to high wind speeds (e.g., the tree and/or branches of the tree are depicted as swaying in a virtual wind) in the virtual environment 414'. Thus, the characteristic of the virtual object (a tree 450A' with high wind characteristics) in the virtual environment 414' matches the characteristic (high wind event) of the state of the physical location 414.

In another example, a virtual ice object in the virtual environment 414' is associated with characteristics metadata indicating the object changes (melts) under certain conditions (e.g., over a threshold temperature). In this example, the characteristic of an ambient temperature in the physical location 414 that is over a predetermined threshold value will cause the synchronization module 422 or 422' to select virtual content that depicts the virtual ice object as melting based on the characteristics metadata of the virtual ice object.

In another example, the synchronization module 422 or 422' determines that heat is generated 20 meters from a user's current location, and adjusts the display of content of the virtual environment 414' accordingly, based on stored rules.

At step 507, the VR system 406 displays the virtual content in the virtual environment 414' to a user (e.g., via the display 411), wherein the virtual content is synchronized with physical stimuli at the physical location 414 for a period of time. In implementations, the virtual world rendering module 423 of the VR system 406 receives the selected virtual content from the synchronization module 422 of the content server 404, or from the synchronization module 422' of the VR system 406, and renders the virtual environment 414', including the selected content, for viewing by a user of the VR system 406.

It should be understood that steps of FIG. 5 may be performed on a dynamic or continuous basis based on the receipt of real-time streaming sensor data and context data. In this way, content displayed in a virtual environment 414' may reflect, in real-time or near-real time, what is occurring in a physical location during the same time period. In embodiments, the VR system 406 dynamically alters displayed VR content of a virtual environment 414' based on sensor data sent from the location-based sensor network 408. In implementations, a user of a VR system 406 at a physical location 414 would experience a virtual environment 414' that is synchronized with physical stimuli (e.g., sun, wind, etc.) of the physical location 414 they are in. In one example, the user would feel the wind and also see the virtual wind acting on virtual objects (e.g., tree 450A') in the virtual environment 414', during the same time period.

In other implementations, a user of a VR system 406 at a physical location 414" would experience a virtual environment 414' that is synchronized with physical stimuli of a remote physical location 414. In implementations, the VR system 406 determines rate of change in sensor parameter values in a real world surrounding along with relative distance of the sensors in the real world, and based on context of the VR content, dynamically synchronizes VR content with the conditions at the real world surrounding. In aspects, the VR system 406 synchronizes and adjusts a strength of injected real world sensor data measurements relative to the position of the virtual user within a virtual environment. In implementations, the VR system 406 utilized a sensor data feed from a recorded time period to apply to the virtual world rendering of an area to replay an actual event location for the specific time period.

Based on the above, it can be understood the embodiments of the invention enable a user to experience a virtual world or environment that is synchronized with a current real world location or environment. In embodiments, at any point in time, if real-world external stimuli measurements are changing (e.g., increase, decreasing, or stopping), the VR system 406 is configured to display virtual content to a user that reflects those changes. In implementations, as a user traverses the virtual world or environment rendition of a real world locations, sensors located in the real world location feed the virtual world rendering engine (e.g., virtual world rendering module 423) with real-time or previously recorded sensor data. In embodiments, the data from the sensors is adjusted for strength from the relative position/distance of the VR user in the virtual rendering, to the sensor position in the real world to provide a more realistic experience.

Figure 6:
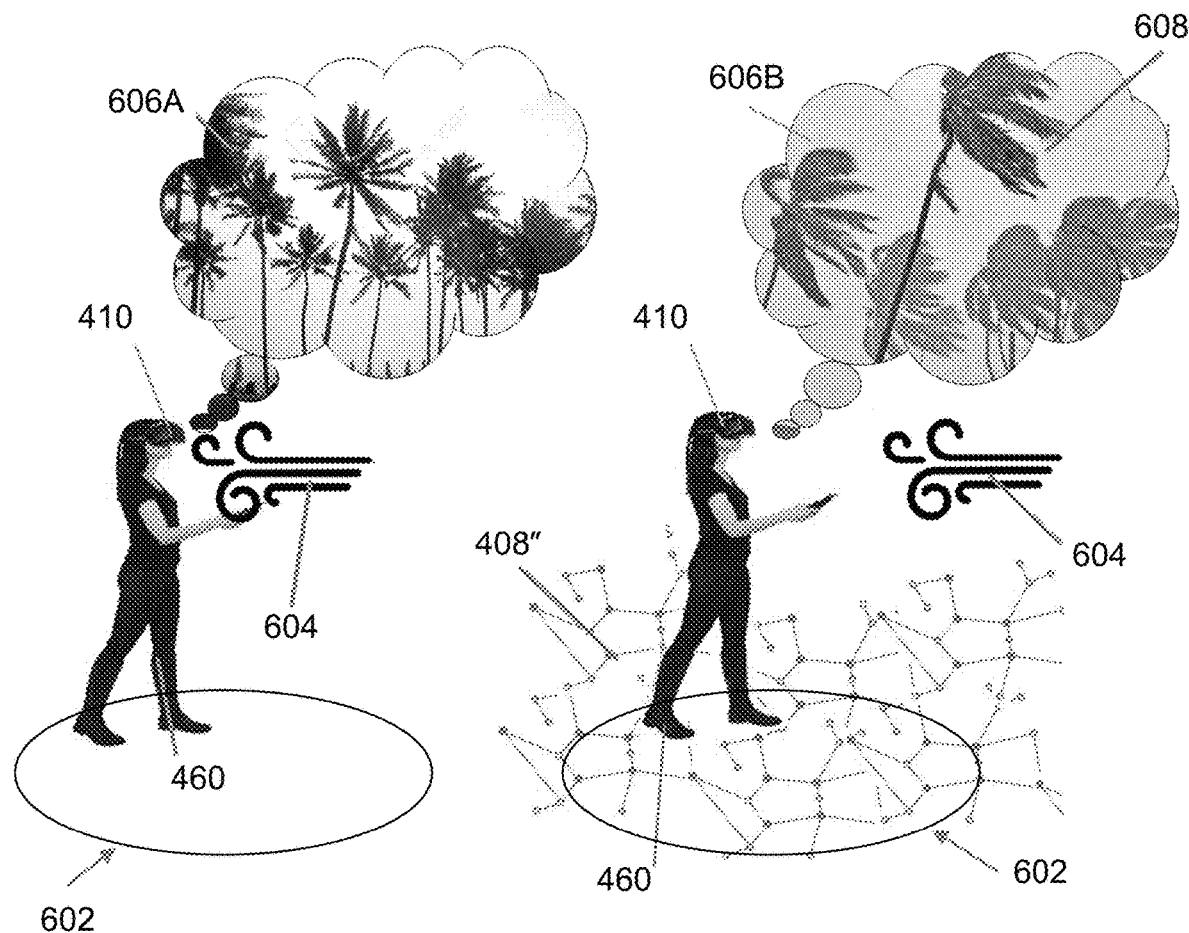
FIG. 6A illustrates an exemplary use scenario in accordance with embodiments of the invention wherein synchronization is enabled.
FIG. 6B illustrates an exemplary use scenario in accordance with embodiments of the invention wherein synchronization is enabled.

FIG. 6A illustrates an exemplary use scenario in accordance with embodiments of the invention wherein synchronization is enabled. Steps illustrated in FIG. 6A may be carried out in the environment of FIG. 4 and are described with reference to elements depicted in FIG. 4.

More specifically, FIG. 6A illustrates an embodiment wherein synchronization according to embodiments of the invention has not been enabled by the user 460 of the VR headset device 410. In this scenario, the user 460 is at a physical location represented by 602, and experiences external stimuli at the physical location, including wind indicated at 604. Without synchronization enabled, the user 460 views a virtual environment 606A that is inconsistent with (not synchronized with) the external stimuli at the physical location 602. Specifically, in the example of FIG. 6A, the user 410 experiences the feeling of the wind 604 at the physical location 602, but no corresponding wind is reflected in the corresponding display of the virtual environment 606A.

FIG. 6B illustrates an exemplary use scenario in accordance with embodiments of the invention wherein synchronization is enabled. Steps illustrated in FIG. 6B may be carried out in the environment of FIG. 4 and are described with reference to elements depicted in FIG. 4.

More specifically, FIG. 6B illustrates an embodiment wherein synchronization according to embodiments of the invention has been enabled by the user 460 of the VR headset device 410. In this scenario, the user 460 is at the same physical location represented by 602, and experiences external stimuli at the physical location 602, including the wind indicated at 604. However, with synchronization enabled, the user 460 views a virtual environment 606B that is consistent with (synchronized with) the external stimuli at the physical location 602. In the example of FIG. 6B, the user 410 experiences the feeling of the wind 604 at the physical location 602, and a corresponding wind is reflected in the display of the virtual environment 606B based on wind sensor measurements obtained from a location-based sensor network 408" at the physical location 602. Specifically, virtual trees (e.g., virtual tree 608) in the virtual environment 606B are shown as moving by the VR headset device 410, as if they are being impacted by the actual wind 604 at the physical location 602.

Figure 7:
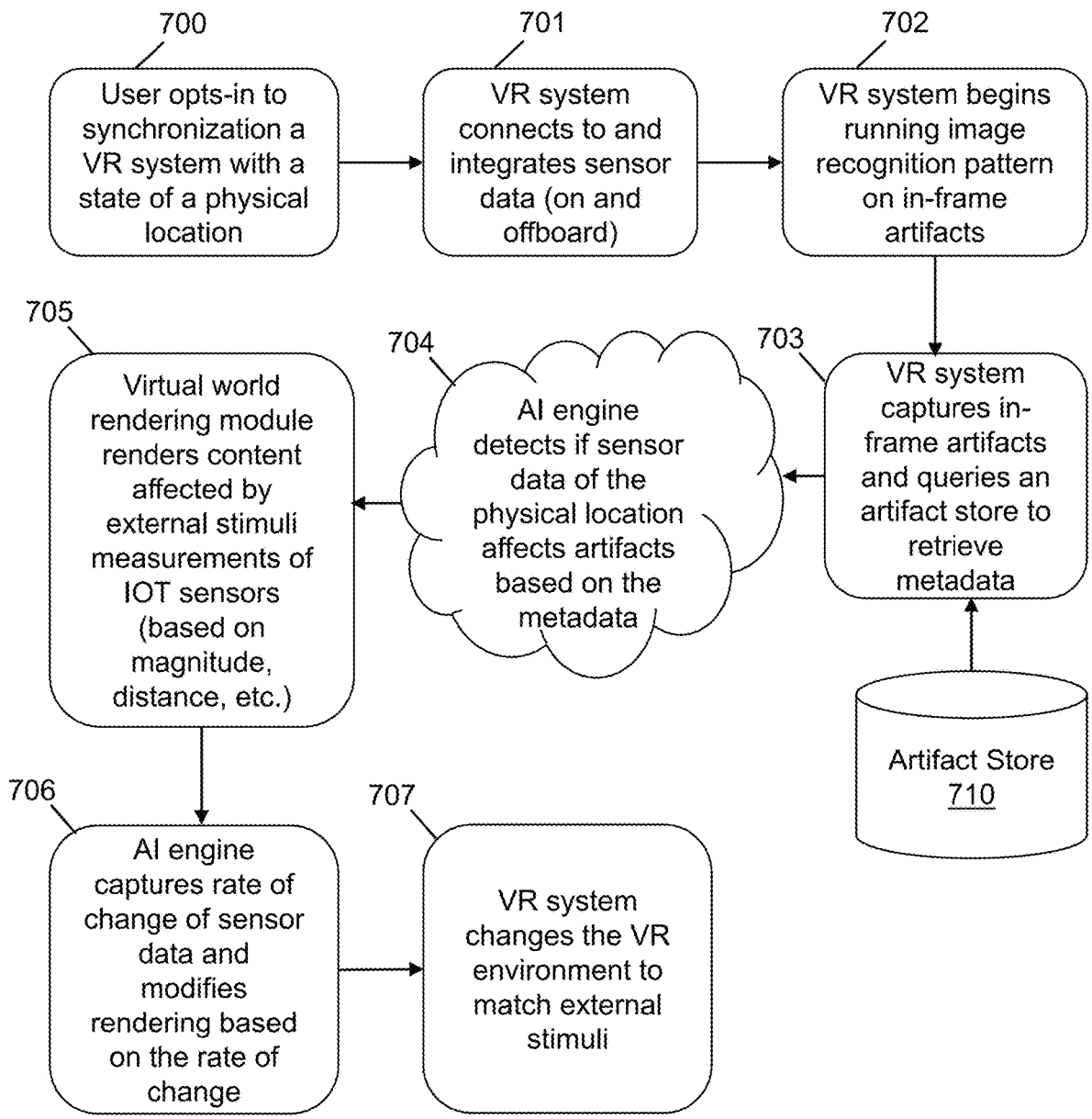
FIG. 7 is a flowchart of method steps according to embodiments of the invention.

FIG. 7 is a flowchart of method steps according to embodiments of the invention. Steps of the method may be carried out in the environment of FIG. 4 and are described with reference to elements depicted in FIG. 4.

At step 700, the user opts in to synchronize a VR system 406 with a state of a physical location 414.

At step 701, the VR system 406 connects to the location-based sensor network 408 and integrates sensor data measuring characteristics (e.g., external stimuli) of the physical location 414.

At step 702, the VR system 406 runs image recognition tools to identify patterns and in-frame artifacts (e.g., virtual content displayed to the user via the display 411).

At step 703, the VR system 406 captures in-frame artifacts (e.g., virtual content displayed to the user via the display 411), and queries an artifact store 710 (virtual content store) to retrieve metadata of the in-frame artifacts.

At step 704, an AI engine (e.g., synchronization module 422 of a cloud-based content server 404) determines if the sensor data of the physical location affects the in-frame artifacts based on the metadata of the in-frame artifacts. In implementations, the VR system 406 communicates with the AI engine to share the sensor data and/or the retrieved metadata of the in-frame artifacts. In implementations, the AI engine obtains sensor data directly from the location-based sensor network 408.

At step 705, the virtual world rendering module 423 of the VR system 406 renders virtual content affected by the external stimuli measured by the sensor data (e.g., based on magnitude and distance).

At step 706, the AI engine (e.g., synchronization module 422' of the VR system 406) captures a rate of change of sensor data and modifies the rendering based on the rate of change.

At step 707, the VR system 406 changes the virtual environment 414' to match the external stimuli at the physical location.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   obtaining, by a computing device, sensor data from a plurality of remote sensors measuring a physical state of a physical location at a time;
   generating, by the computing device, context specific parameter data based on the sensor data, wherein the context specific parameter data includes values for different parameters at the time;
   obtaining, by the computing device, context data from a remote VR system via a network connection, wherein the context data reflects a current state of virtual content in a virtual environment displayed by the remote VR system;
   selecting, by the computing device, virtual content from a store of virtual content to be displayed in the virtual environment by the remote VR system based on the context specific parameter data, the context data, and stored rules, wherein the selecting the virtual content is based on a relative distance between each of the plurality of remote sensors and a virtual user; and
   sending, by the computing device, the virtual content to the remote VR system to be displayed to a user, wherein the virtual content reflects a state of the physical location at the time.

2. The method of claim 1, wherein the remote sensors comprise one or more selected from the group consisting of: a temperature sensor, a light sensor, a wind sensor, a magnetic field sensor, and an electrical field sensor.

3. The method of claim 1, further comprising:
   determining, by the computing device, a position of the virtual user in the virtual environment based on the context data;
   determining, by the computing device, a location of each of the plurality of remote sensors within the physical location, wherein the context specific parameter data includes the location of each of the plurality of remote sensors; and
   calculating, by the computing device, a relative distance between each of the plurality of remote sensors and the virtual user.

4. The method of claim 1, wherein the context specific parameter data includes a strength level of one of more of the different parameters at the time, and the strength level comprises at least one selected from the group consisting of: a strength level of temperature, a strength level of wind, a strength level of light, a strength level of a magnetic field, and a strength level of an electrical field.

5. The method of claim 4, wherein the selecting the virtual content from the store of virtual content to be displayed in the virtual environment by the remote VR system is based on the strength level of the one or more of the different parameters at the time.

6. The method of claim 1, wherein:
   the obtaining sensor data from the plurality of remote sensors measuring the state of the physical location at the time comprises continuously obtaining streaming digital sensor data from the plurality of remote sensors over a period of time;
   the generating context specific parameter data based on the sensor data occurs continuously during the period of time;

the selecting the virtual content from the store of virtual content to be displayed in the virtual environment by the remote VR system occurs continuously based on the generated context specific parameter data; and the sending the virtual content to the remote VR system to be displayed to the user comprises continuously streaming the virtual content to the remote VR system in real time during the period of time, such that the virtual content displayed to the user via the VR system is visually synchronized with the physical state of the physical location over the period of time.

7. The method of claim 1, wherein the virtual content includes virtual objects having characteristics synchronized with characteristics of the context specific parameter data.

8. The method of claim 7, wherein the virtual objects have characteristics synchronized with one or more characteristics of the context specific parameter data selected from the group consisting of: a strength level of temperature, a strength level of wind, a strength level of light, a strength level of a magnetic field, and a strength level of an electrical field.

9. The method of claim 1, wherein the computing device includes software provided as a service in a cloud environment.

10. A computer program product comprising one or more computer readable storage media having program instructions collectively stored on the one or more computer readable storage media, the program instructions executable by a computing device to:
obtain sensor data from a plurality of remote sensors measuring a physical state of a location at a time;
generate context specific parameter data based on the sensor data, wherein the context specific parameter data includes values for different parameters at the time;
obtain context data from a remote VR system via a network connection, wherein the context data reflects a current state of virtual content in a virtual environment displayed by the remote VR system;
calculate a relative distance between each of a plurality of remote sensors and a virtual user;
select virtual content from a store of virtual content to be displayed in the virtual environment by the remote VR system by matching characteristics of the virtual content with corresponding characteristics in the context specific parameter data based on the context data and stored rules; and
stream the virtual content to the remote VR system to be displayed to a user in a virtual environment, wherein the virtual content reflects a state of the physical location at the time.

11. The computer program product of claim 10, wherein the remote sensors comprise one or more selected from the group consisting of: a light sensor, a wind sensor, a magnetic field sensor, and an electrical field sensor.

12. The computer program product of claim 10, wherein the program instructions are further executable by the computing device to:
determine a position of the virtual user in the virtual environment based on the context data; and
determine a location of each of the plurality of remote sensors within a physical location, wherein the context specific parameter data includes the location of each of the plurality of remote sensors;
wherein the selecting the virtual content is based on the relative distance between each of the plurality of remote sensors and the virtual user.

13. The computer program product of claim 10, wherein the context specific parameter data includes a strength level of one or more of the different parameters at the time, and the strength level comprises at least one selected from the group consisting of: a strength level of temperature, a strength level of wind, a strength level of light, a strength level of a magnetic field, and a strength level of an electrical field.

14. The computer program product of claim 13, wherein the selecting the virtual content from the store of virtual content to be displayed in the virtual environment by the remote VR system is based on matching the strength level of the one or more of the different parameters at the time with a strength level of the characteristic of the virtual content.

15. The computer program product of claim 10, wherein:
the obtaining sensor data from the plurality of remote sensors measuring the state of the physical location at the time comprises continuously obtaining streaming digital sensor data from the plurality of remote sensors over a period of time;
the generating context specific parameter data based on the sensor data occurs continuously during the period of time;
the selecting the virtual content from the store of virtual content to be displayed in the virtual environment by the remote VR system occurs continuously based on the generated context specific parameter data; and
the streaming the virtual content to the remote VR system to be displayed to the user comprises continuously streaming the virtual content to the remote VR system in real time during the period of time, such that the virtual content displayed to the user via the VR system is visually synchronized with the physical state of the physical location over the period of time.

16. A system comprising:
a processor, a computer readable memory, one or more computer readable storage media, and program instructions collectively stored on the one or more computer readable storage media, the program instructions executable by a virtual reality system to:
obtain sensor data from a plurality of remote sensors measuring a physical state of a location at a time;
generate context specific parameter data based on the sensor data, wherein the context specific parameter data includes values for different parameters at the time;
determine context data reflecting a current state of virtual content in a virtual environment displayed by the virtual reality system;
determine a location of each of the plurality of remote sensors within the location, wherein the context specific parameter data includes the location of each of the remote sensors;
select virtual content from a store of virtual content to be displayed in the virtual environment by the virtual reality system based on the context specific parameter data, the context data, and stored rules; and
displaying the virtual content in the virtual environment to a user, wherein the virtual content reflects a state of the physical location at the time.

17. The system of claim 16, wherein the remote sensors comprise one or more selected from the group consisting of: a temperature sensor, a light sensor, a wind sensor, a magnetic field sensor, and an electrical field sensor.

18. The system of claim 16, wherein the program instructions are further executable by the virtual reality system to:
determine a position of a virtual user in the virtual environment based on the context data;

and
calculate a relative distance between each of the plurality of remote sensors and the virtual user,
wherein the selecting the virtual content is based on the relative distance between each of the plurality of remote sensors and the virtual user.

19. The system of claim 16, wherein:
the context specific parameter data includes a strength level of one of more of the different parameters at the time, and the strength level comprises at least one selected from the group consisting of: a strength level of temperature, a strength level of wind, a strength level of light, a strength level of a magnetic field, and a strength level of an electrical field; and
the selecting the virtual content from the store of virtual content to be displayed in the virtual environment by the virtual reality system is based on the strength level of the one or more of the different parameters at the time.

20. The system of claim 16, wherein:
the obtaining the sensor data from the plurality of remote sensors measuring the physical state of the location at the time comprises continuously obtaining streaming digital sensor data from the plurality of remote sensors over a period of time;
the generating context specific parameter data based on the sensor data occurs continuously during the period of time;
the selecting the virtual content from the store of virtual content to be displayed in the virtual environment by a remote VR system occurs continuously based on the generated context specific parameter data; and
the displaying the virtual content in the virtual environment to a user comprises continuously displaying the virtual content in real time during the period of time, such that the virtual content displayed to the user is visually synchronized with the physical state of the location over the period of time.

* * * * *